United States Patent
Macugay et al.

(10) Patent No.: US 11,138,221 B1
(45) Date of Patent: Oct. 5, 2021

(54) DATA AGGREGATION AND REPORTING ENVIRONMENT FOR DATA CENTER INFRASTRUCTURE MANAGEMENT

(71) Applicant: Wells Fargo Bank, N.A., San Francisco, CA (US)

(72) Inventors: Angelo Macugay, Pacifica, CA (US); Ken Camut, Huntersville, NC (US); Deb Motto, Phoenix, AZ (US); Jason Hill, Fairview, NC (US); Charlie Wands, Denver, NC (US); Bob Culver, Scottsdale, AZ (US)

(73) Assignee: WELLS FARGO BANK, N.A., San Fransisco, CA (US)

( * ) Notice: Subject to any disclaimer, the term of this patent is extended or adjusted under 35 U.S.C. 154(b) by 138 days.

(21) Appl. No.: 16/457,200

(22) Filed: Jun. 28, 2019

Related U.S. Application Data

(63) Continuation of application No. 14/549,015, filed on Nov. 20, 2014, now Pat. No. 10,380,135.

(60) Provisional application No. 62/014,379, filed on Jun. 19, 2014.

(51) Int. Cl.
*G06F 16/25* (2019.01)
*G06F 16/21* (2019.01)

(52) U.S. Cl.
CPC .......... *G06F 16/254* (2019.01); *G06F 16/21* (2019.01)

(58) Field of Classification Search
CPC .............................. G06F 16/254; G06F 16/21
See application file for complete search history.

(56) References Cited

U.S. PATENT DOCUMENTS

| | | | |
|---|---|---|---|
| 5,144,679 | A | 9/1992 | Kakumoto et al. |
| 6,212,526 | B1 * | 4/2001 | Chaudhuri ............ G06F 16/285 |
| 6,691,116 | B1 | 2/2004 | Bart |
| 8,917,513 | B1 | 12/2014 | Hazzard |
| 9,105,000 | B1 | 8/2015 | Bingham et al. |
| 2001/0044795 | A1 | 11/2001 | Barrett et al. |
| 2003/0037034 | A1 | 2/2003 | Daniels et al. |
| 2005/0055357 | A1 | 3/2005 | Campbell |
| 2006/0218278 | A1 * | 9/2006 | Uyama ............... H04L 41/5064 |
| | | | 709/226 |
| 2009/0276771 | A1 | 11/2009 | Armijo et al. |
| 2012/0124115 | A1 | 5/2012 | Ollmann |
| 2013/0046558 | A1 | 2/2013 | Farooq et al. |
| 2013/0246410 | A1 | 9/2013 | Bandara |
| 2013/0282320 | A1 | 10/2013 | Burzykowski et al. |
| 2014/0304218 | A1 * | 10/2014 | Chang ................... G06F 16/338 |
| | | | 707/603 |
| 2014/0358971 | A1 | 12/2014 | Aminzade et al. |
| 2015/0081617 | A1 | 3/2015 | Applegate et al. |

(Continued)

*Primary Examiner* — Jay A Morrison
(74) *Attorney, Agent, or Firm* — Kilpatrick Townsend & Stockton LLP

(57) ABSTRACT

Systems and methods that facilitate data center infrastructure management are discussed. One such system can include a plurality of data center infrastructure management (DCIM) tools. Each DCIM tool can maintain data associated with one or more data centers. Such a system can also include a data aggregation component that can extract the maintained data from at least two of the plurality of DCIM tools and can transform the extracted data into a common format. Such a system can also include an aggregated database that stores the extracted data, and can include a user interface that can provide for simultaneous access to the plurality of DCIM tools.

20 Claims, 7 Drawing Sheets

(56) References Cited

U.S. PATENT DOCUMENTS

2015/0186910 A1* 7/2015 Cruickshank ...... G06Q 30/0205
705/7.34
2015/0356130 A1* 12/2015 Clifford ............... G06F 16/951
707/741
2016/0352836 A1* 12/2016 Kamalakantha ...... G06F 16/214

* cited by examiner

500

- Title Describing Currently Displayed Information (e.g., "Optimal Touch Site A – Forecast 201405," etc.)

| DCIM Tool Names (e.g., Optimal Touch, etc.) (Hyperlinked) | Search Interface |
|---|---|
| Various Interaction Tabs Specific to Selected DCIM tool (e.g., Sites, Planner, Location Mismatch, ID Mismatch, etc.) (Hyperlinked) ||
| List of Sites with Associated Numbers of Database Entries (e.g., Hardware, etc.) (Hyperlinked) ||
| List of Forecast Dates with Associated Numbers of Entries (Hyperlinked) ||
| List of Forecasted Activities with Associated Numbers of Entries (Hyperlinked) ||
| List of Hardware Models with Associated Numbers of Entries (Hyperlinked) ||
| List of Projects with Associated Numbers of Entries (Hyperlinked) ||
| List of Planners (e.g., DCIM Personnel, etc.) with Associated Numbers of Entries (Hyperlinked) ||

510

Table of Selected Entries (e.g., Hardware associated with a Selected Site) with Context-Appropriate Columns (and Entries in Cells Hyperlinked as well as Searchable), such as:

| Site | LOB | Planner | Hostname | NZHostname | Location | NZLocation |
|---|---|---|---|---|---|---|
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |

FIG. 5

DATA AGGREGATION AND REPORTING ENVIRONMENT FOR DATA CENTER INFRASTRUCTURE MANAGEMENT

CROSS-REFERENCE TO RELATED APPLICATIONS

This application is a continuation of U.S. patent application Ser. No. 14/549,015, entitled "DATA AGGREGATION AND REPORTING ENVIRONMENT FOR DATA CENTER INFRASTRUCTURE MANAGEMENT," filed Nov. 20, 2014, which claims the benefit of U.S. Provisional Application Ser. No. 62/014,379, filed Jun. 19, 2014, and entitled "DATA AGGREGATION AND REPORTING ENVIRONMENT FOR DATA CENTER INFRASTRUCTURE MANAGEMENT." The entireties of these applications are incorporated herein by reference.

BACKGROUND

Data center infrastructure management (DCIM) extends traditional data center management functions to include the physical assets and resources of data centers, integrating information technology with facility management to centralize monitoring, management, and capacity planning in connection with data centers. Aspects of DCIM include physical asset lifecycle management and facilities monitoring and access. DCIM can provide capabilities related to capacity planning, high-fidelity visualization, real-time monitoring, cable/connectivity management, environmental/energy sensors, business analytics (including financial modeling), and process/change management.

DCIM incorporates information from specialized software, hardware, and sensors, many of which are provided by differing vendors, and are not designed with the intent to be integrated with one another. Conventionally, DCIM involves manual examination and monitoring of information from these diverse resources.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can facilitate access to and interaction with a plurality of DCIM tools. One such system can include a plurality of data center infrastructure management (DCIM) tools. Each DCIM tool can maintain data associated with one or more data centers. Such a system can also include a data aggregation component that can extract the maintained data from at least two of the plurality of DCIM tools and can transform the extracted data into a common format. Such a system can also include an aggregated database that stores the extracted data, and can include a user interface that can provide for simultaneous access to the plurality of DCIM tools.

In another aspect, the subject innovation can include a method that can facilitate data center infrastructure management. Such a method can include collecting data associated with one or more data centers by way of a plurality of DCIM tools, extracting data from at least two of the plurality of DCIM tools, transforming the extracted data into a common format, loading the transformed data into an aggregated database, and presenting portions of the aggregated database on a user interface.

In further aspects, the subject innovation can comprise a system that can facilitate DCIM management. Such a system can include means for collecting data associated with one or more data centers, and means for extracting the collected data. The means for extracting can transform the extracted data into a common format. The system can also include means for maintaining the transformed data and means for presenting the maintained data.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 5 illustrates an example layout of a user interface in accordance with aspects of the subject innovation.

DETAILED DESCRIPTION

Figure 1:
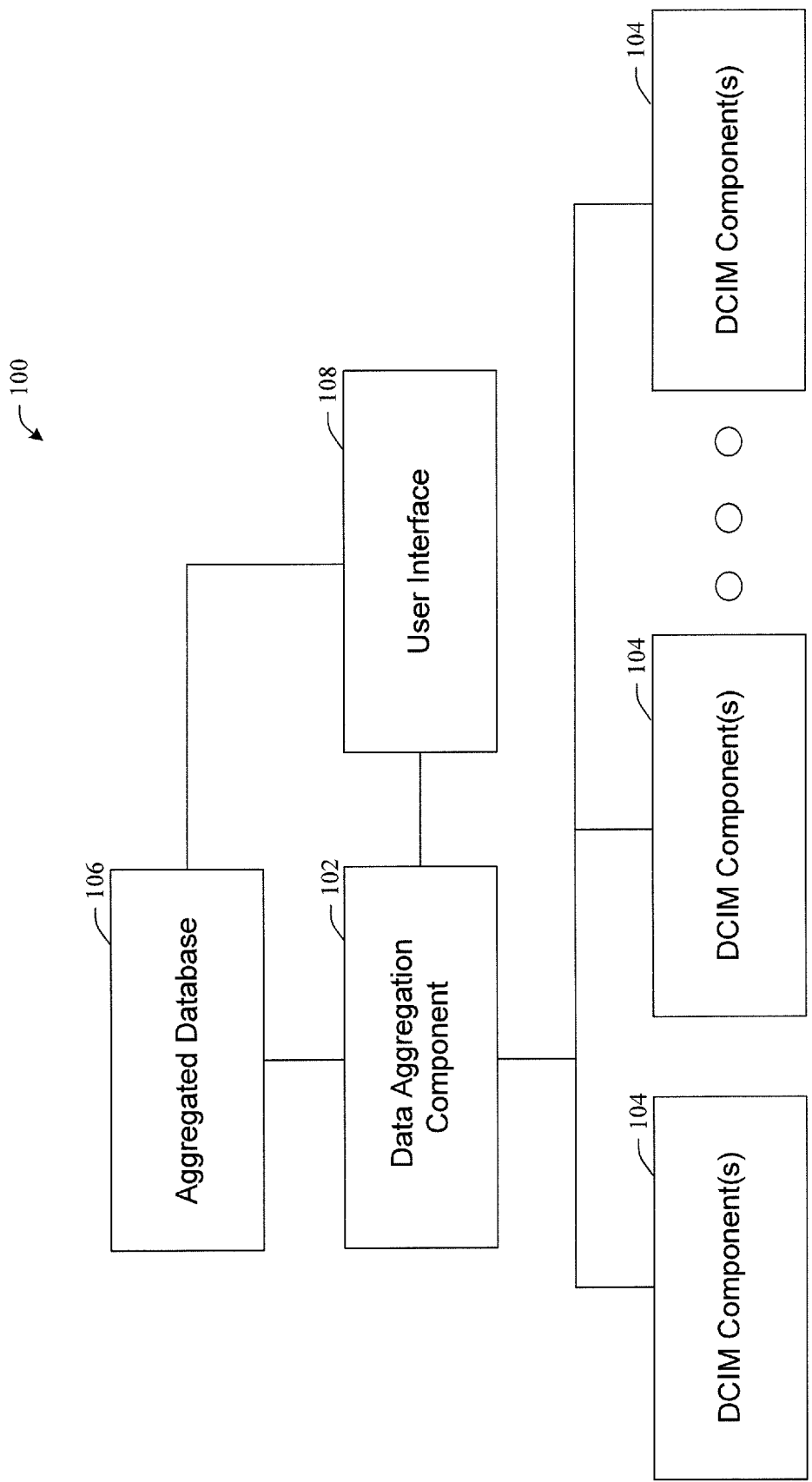
FIG. 1 illustrates a data aggregation and reporting environment system in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

The subject disclosure, in various aspects, provides systems and methods that facilitate monitoring of information (e.g., by a user, such as a member of a data center team, etc.) related to data center performance. In aspects, the subject innovation can comprise an interface that can allow for easy identification of anomalies, identification and resolution of problems, and can facilitate more efficient use of resources. The subject application can extract data from each of a plurality of data center infrastructure management tools or systems, transform that data into a common form suitable for comparisons and identification of anomalies, etc., and load that data into an aggregated database suitable for presentation to a user via a user interface such as described herein (e.g., employing dynamic context switching, etc.). The extracted data can be made an exact fit into a table, and if necessary can be rounded up so that the table is not oversized. User interfaces employable in connection with aspects of the subject innovation can employ dynamic context switching, wherein the user interface can dynamically change the context of data a user is examining by clicking on any reported metrics, sites, etc., which can be provided, for example, as hyperlinks, such as to initiate database queries (e.g., SQL queries, etc.) that return information based on the nature of the information associated with the hyperlink, etc. This returned information can then be presented via the user interface in a similar manner, such that the returned information is presented in a readily understandable format, with items presented as hyperlinks that generate further queries. User interfaces described herein can be employed to compare multiple different data fields in a single user interface, while providing for the ability to investigate associated information based on hyperlinked data that can be used to generate further queries and dynamically change the display based upon those queries.

In aspects, the subject innovation can include systems and methods that can facilitate detailed analysis of data center capacity. Embodiments of the subject innovation can aggregate data from multiple Systems of Record (SORs) to present a holistic view of forecasted demand and available capacity. This data aggregation can facilitate well-informed decisions to effectively manage space, power, and infrastructure in order to accommodate hardware installations across a plurality of data centers. The subject innovation can provide multiple advantages over conventional systems and methods, including, but not limited to: (1) the ability to provide one location to view multiple SORs where data has been aggregated into a single database; (2) the ability to provide detailed insight into a data source, facilitating quick and easy identification of anomalies with the source data, such as inconsistencies in data formatting and/or abnormal patterns that can be addressed and remediated to ensure greater accuracy and consistency with future data loads; and (3) the ability to provide a simple user interface to identify and pinpoint critical exceptions through "one-click hyper aggregation context switching" (e.g., aggregated groupings of data that are hyper-linked to dynamically change views, similar to a Microsoft Excel pivot table or filter, etc.). On the database backend, the subject innovation can employ a novel "exact fit" method of building the tables to store the SORs to ensure the database is optimally sized with no wasted space.

Referring initially to the drawings, FIG. 1 illustrates a data aggregation and reporting environment system 100 in accordance with aspects of the subject innovation. In various aspects, system 100 can include a data aggregation component 102 that can extract information from a plurality of data center infrastructure management (DCIM) components or tools 104. Each DCIM component or tool can include one or more of software, hardware, sensors, etc. that collects, analyzes, produces, etc. and/or maintains information associated with one or more data centers, and can be, in various embodiments, any commercially available or proprietary DCIM product, etc. In various aspects, the data aggregation component 102 can extract DCIM data from the plurality of DCIM components 104, transform the data into a common form suitable for comparison, and load the extracted and transformed data into an aggregated database 106. Information in the aggregated database 106 can be provided to a user via a user interface 108 that can be included in system 100, such as that described herein. A user of system 100 can monitor information extracted from each of the plurality of DCIM components 104 through a single user interface 108, allowing for easy identification of anomalies (e.g., system architecture components named differently in different DCIM components, system architecture components misidentified or not identified in one or more DCIM components, etc.), more efficient use of resources (e.g., physical resources, power usage, etc.), and improved future planning relating to DCIM (e.g., by identifying system architecture components to be replaced along with associated information, e.g., related to power, cooling, space, etc.), etc.

Each of the DCIM components 104 can collect information regarding one or more associated data centers and provide that information to the data aggregation component 102. Depending on the nature of each DCIM component, this information can take a variety of forms, for example, network and data center diagramming and planning, capacity planning, information from sensors, power management systems, monitoring systems, analytics systems, building management systems, etc. As this information is received by data aggregation component 102, it can be maintained in an aggregated database 106. Data aggregation component 102 can compare information from each of the DCIM components 104 against each other to identify any anomalies, conflicts, discrepancies, missing or incomplete information, etc. that may exist between the information received from the various DCIM components 104. In the event any anomalies, conflicts, discrepancies, missing or incomplete information, etc. is identified, these conflicts, etc. can be presented to a user via user interface 108.

Figure 2:
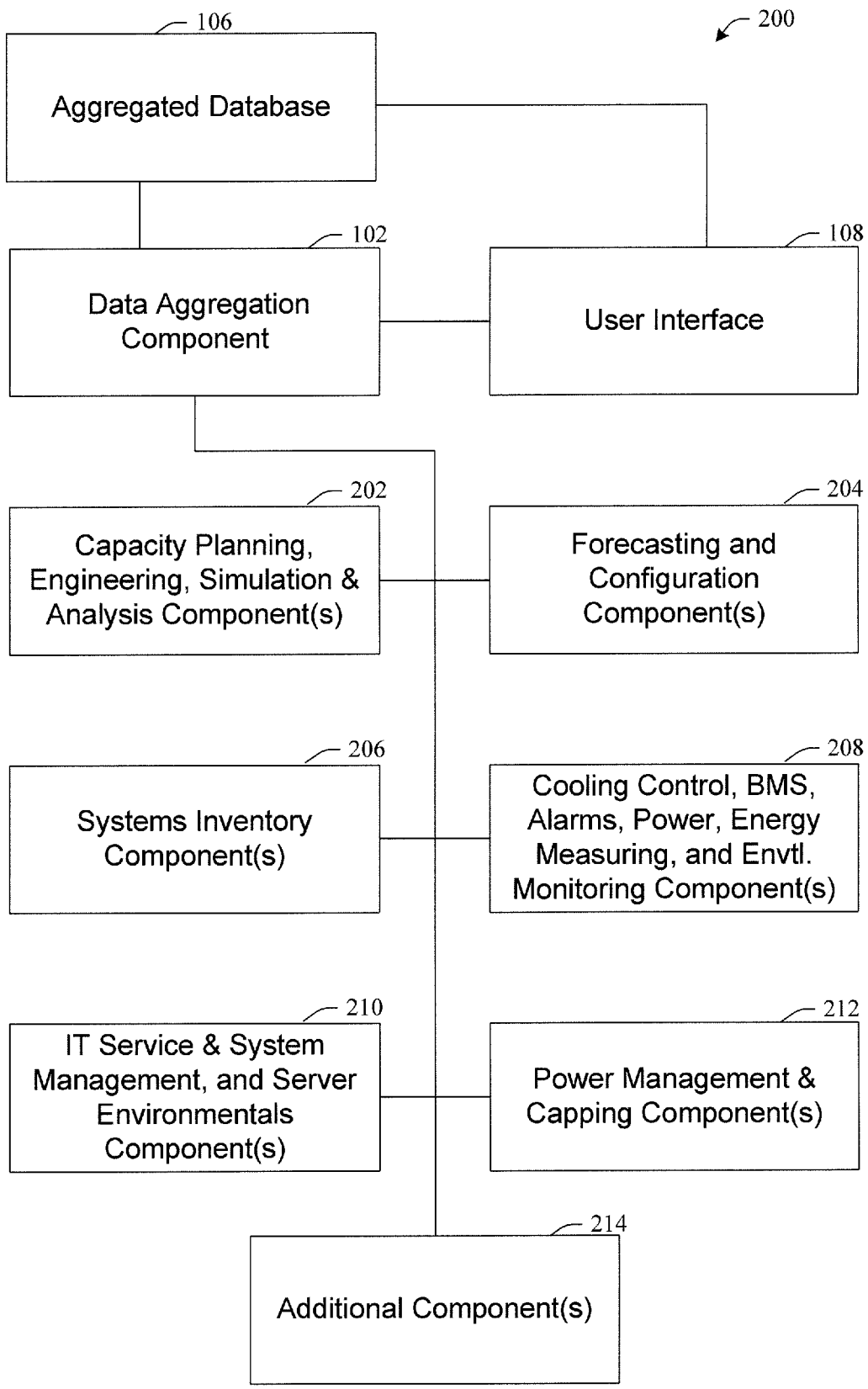
FIG. 2 illustrates an example system as one possible implementation of the subject innovation, showing possible categories of DCIM components that can be used in connection with aspects of the subject innovation.

FIG. 2 illustrates an example system 200 as one possible implementation of the subject innovation, showing possible categories of DCIM components 104 that can be used in connection with aspects of the subject innovation. Data aggregation component 102, aggregated database 106, and user interface 108 can interact with a variety of DCIM components of categories shown in 202-214. These DCIM components can include (1) one or more capacity planning, engineering, simulation, or analysis components 202, which can include, for example, DCIM products such as NetZoom, an infrastructure forecasting dashboard or similar system (e.g., that can provide hardware forecasts, such as by infrastructure personnel, etc.), facility infrastructure modeling systems, etc.; (2) one or more forecasting or configuration components 204, such as components related to blueprint engineering (e.g., configuration information for systems, etc.), demand planning (e.g., hardware forecasts provided by platform owners, etc.), optimal touch (e.g., more detailed hardware forecasts provided by platform owners, etc.), etc.; (3) one or more systems inventory components 206, such as Atrium, Tideway, Remedy Asset, etc.; (4) one or more cooling control, building management system (BMS), alarm, power, energy measurement, or environmental monitoring components 208, such as Modius, IBM Measurement & Management Technologies (MMT) or similar systems, various building management systems, and additional or alternative facility infrastructure, such as power distribution units, remote power panels, etc.; (5) one or more information technology (IT) service and system management, or server environmental components 210, for example, IT monitoring components such as HP service activator, IBM Tivoli, system reporting systems such as automatic database diagnostic monitor (ADDM), or other IT monitoring systems, including but not limited to Future Facilities, Hara, manual PTO lab, Sentilla, etc.; (6) one or more power management or capping components 212, for example, active power management systems such as Power Assure, etc.; and (7) one more additional DCIM components 214, for example, sustainability software such as Hara, Netcool, STSP (Straight Through Server Provisioning), E2E (End to End), etc.

Figure 3:
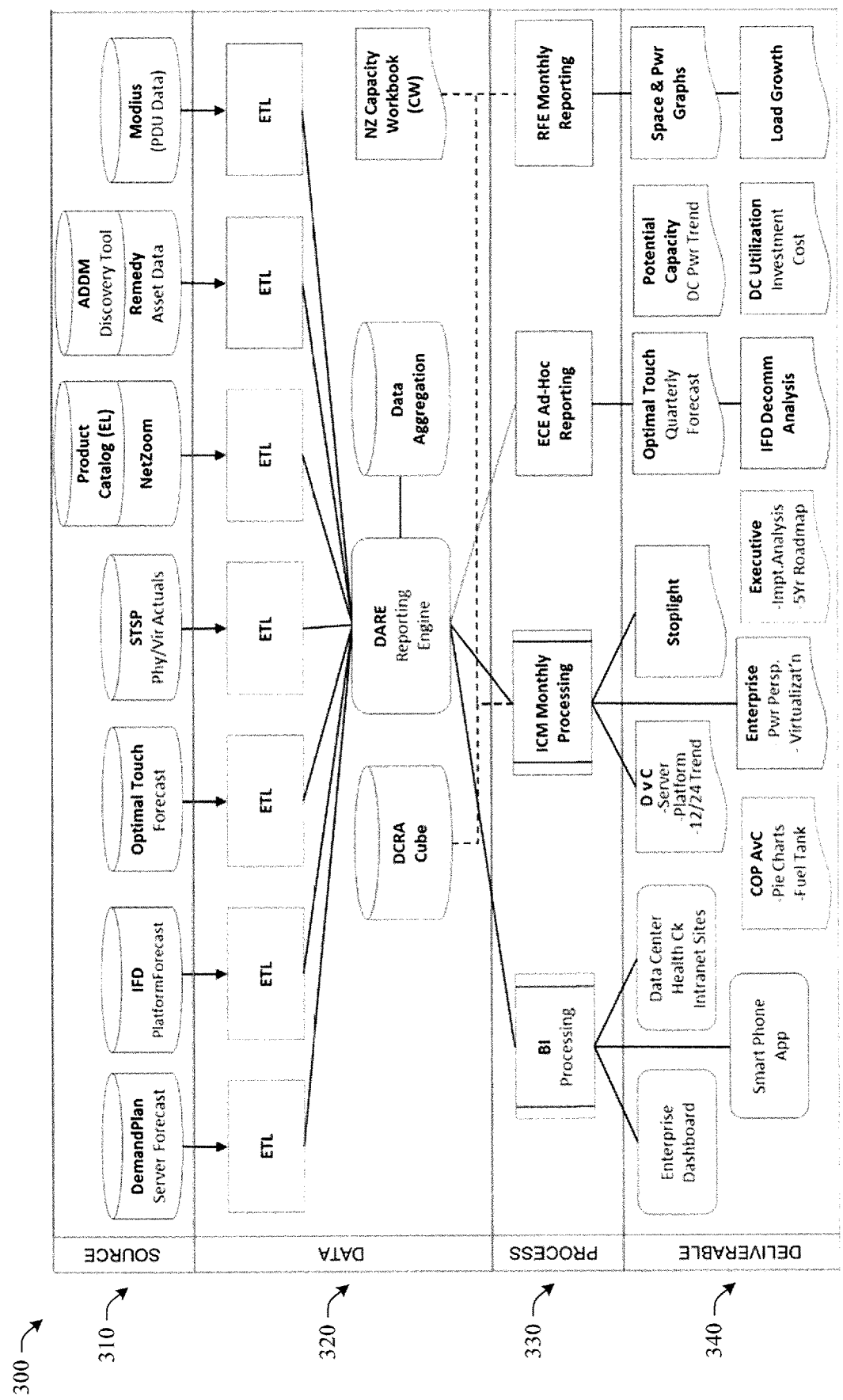
FIG. 3 illustrates an example data flow that can be employed in aspects of the subject innovation.

FIG. 3 illustrates an example data flow 300 that can be employed in aspects of the subject innovation. It is to be understood that data flow 300 is but one example of a data flow that can be employed in connection with aspects and embodiments of the subject innovation, and depending on the specific nature of the embodiment, differing data flows may be employed than data flow 300. Data flow 300 indicates how aspects of the subject innovation can employ multiple DCIM tools or systems, as shown at 310, to collect or maintain information relevant to various aspects of data center infrastructure management. As seen in 320, this information can be extracted, transformed, and loaded by a reporting engine (e.g., comprising data aggregation component 102, etc.) into a database (e.g., aggregated database 106, etc.). This information, along with, potentially, additional information (such as the examples shown in 320, etc.), can be used in various processes and analytics, such as the examples provided in 330 (e.g., business intelligence processing, ICM processing, etc.). The processes in 330 and the data in 320 can be used to generate any of a variety of deliverables (e.g., reports, analytics, etc.), as shown at 340. These can include an enterprise dashboard and/or smart phone application for interacting with data maintained by systems and methods of the subject innovation, for example, via a user interface such as user interface 108, as well as a variety of additional reports, analytics, predictive analysis, etc.

Figure 4:
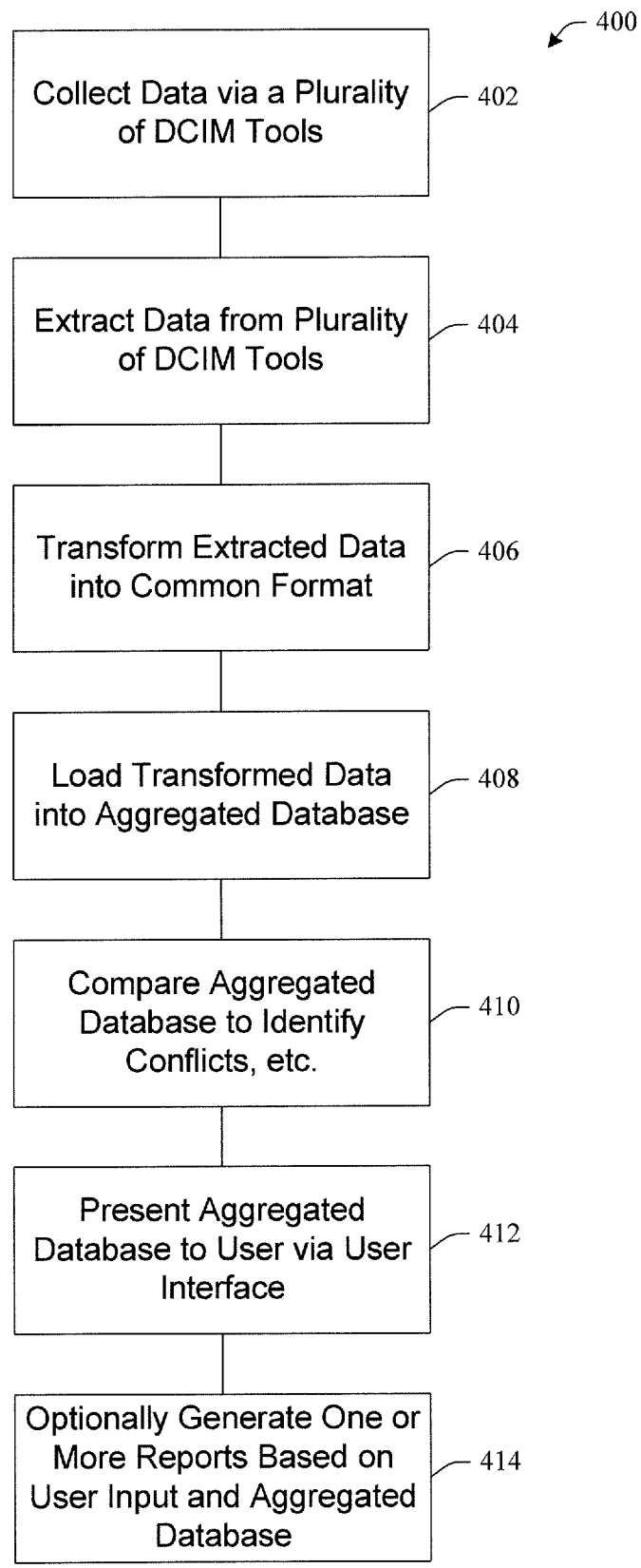
FIG. 4 illustrates a method that facilitates data aggregation and reporting in connection with DCIM in accordance with aspects of the subject innovation.

FIG. 4 illustrates a method 400 that facilitates data aggregation and reporting in connection with DCIM in accordance with aspects of the subject disclosure. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 400 can include, at 402, the act of collecting data via a plurality of DCIM tools, wherein the nature of the data collected will depend on the specific DCIM tools involved and the data centers, system components, etc. about which the data is collected. At 404, data collected from the plurality of DCIM tools can be extracted (e.g., by a data aggregation component 102, etc.) for aggregation, reporting, etc. At 406, the extracted data, which can, in general, be in disparate formats, can be transformed into a common format for comparison. At 408, this transformed data can be loaded into a common database such that any conflicts or discrepancies can be identified, and for user interaction via queries, report generation, etc. For building the database and storing content therein, an "exact fit" method of building tables used to store the systems of record can be employed, which can ensure that the database is optimally sized with no wasted space. At 410, the information in the aggregated database can be compared (e.g., comparing information from various DCIM tools, etc.) to identify any conflicts, discrepancies, missing information, etc. At 412, the aggregated database can be presented to a user, such as via a user interface similar to that described herein. The presented information can include any conflicts, discrepancies, etc., which have been identified. At 414, one or more reports, etc. can be generated from the information in the aggregated database, in response to received user input.

FIG. 5 illustrates an example layout 500 of a user interface in accordance with aspects of the subject innovation. It is to be appreciated that example layout 500 is provided for the purposes of illustrating various aspects of the subject innovation in the context of specific examples, but the subject innovation can include layouts and user interfaces other than that described herein. Example layout 500 can be used in connection with a user interface of the subject innovation, e.g., user interface 108, and can allow for interaction with a plurality of DCIM tools or systems through a single interface (e.g., via data aggregation component 102 and an aggregated database 106, etc.).

Example layout 500 can include hyperlinks to a plurality of DCIM tools (seen near the top in layout 500), which can provide access to top-level data regarding each of the listed DCIM tools, such that clicking on any of the hyperlinks will generate a database query (e.g., SQL query, etc.) that can return results associated with that DCIM tool (e.g., from the aggregated database 106, etc.), which can be further explored via various hyperlinks in the returned results (e.g., each of which can generate a relevant SQL query, with the results presented as hyperlinks that generate relevant SQL queries, etc.). Additionally or alternatively, a search interface can also be provided (e.g., as shown near the top of layout 500, etc.), which can provide for generation of queries (e.g., and associated results, etc.), for example, by searching for a specific data center, etc., results can be returned relevant to that data center, such as indicated hardware models, projects, planners, and additional data and hyperlinks shown in 510. Additionally, different specific interaction tabs can be provided based on the context of the user interface. For example, for the example forecast shown in layout 500, tabs can include content associated with sites, planners, location mismatches (e.g., where different DCIM tools indicate different locations for the same resource, etc.), identification mismatches (e.g., where different DCIM tools indicate different identifications for the same resource, etc.), etc.

Depending on the specific query that generated a current state of the user interface (e.g., the specific state indicated by layout 500 corresponds to a specific forecast for a specific site in connection with the Optimal Touch DCIM tool, etc.), the exact nature of the information presented in layout 500 and particularly at 510 can vary, because of the context of the user interface dynamically changing in response to selected links (e.g., which can generate SQL queries, based on which the user interface can be configured to present the results of the query, etc.). For different DCIM tools, information displayed can be of types appropriate to those tools. For example, for NetZoom, categories of information (e.g., with individual types of entries hyperlinked to generate SQL queries and dynamically change the user interface to present the query results in hyperlinked form, etc.) can include sites, rows, racks, equipment types, models, service categories, as well as specific information for individual items such as data center, equipment name, installation date, serial number, model name, power consumption, rack, etc. In another example, for Remedy, categories of information can include site name, manufacturer, product name, etc., and specific information for individual items can include CI name, product name, manufacturer name, serial number, grid, tier, etc. Depending on the nature of the DCIM tool and user interface state, different tabs can be used as well in connection with layout 500, such as rack population, BPE summary or BPE detail, etc.

Additionally, the system of the subject innovation can be applied for a variety of forecasting and planning. Because the subject innovation can aggregate data from multiple DCIM tools, users of the subject innovation can obtain a more complete picture of various aspects of data center management, providing for the ability to make more informed forecasting regarding aspects such as server demand and capacity, power and cooling requirements, carbon footprint, funding/budgeting, etc., all from a single, unified interface.

Figure 6:
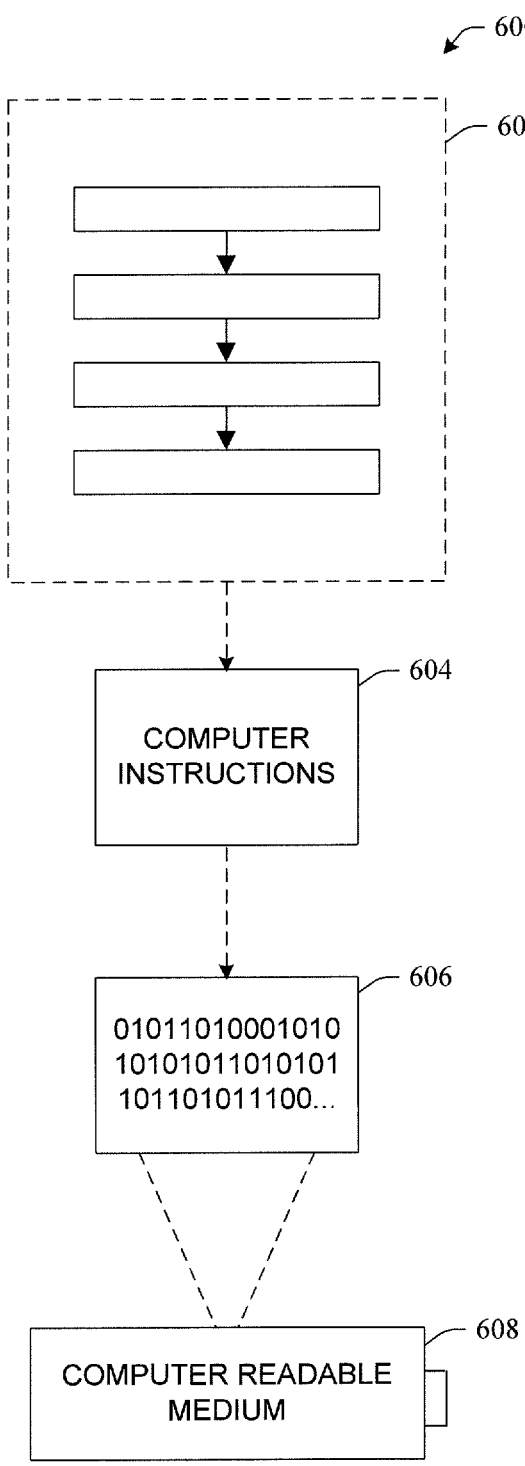
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
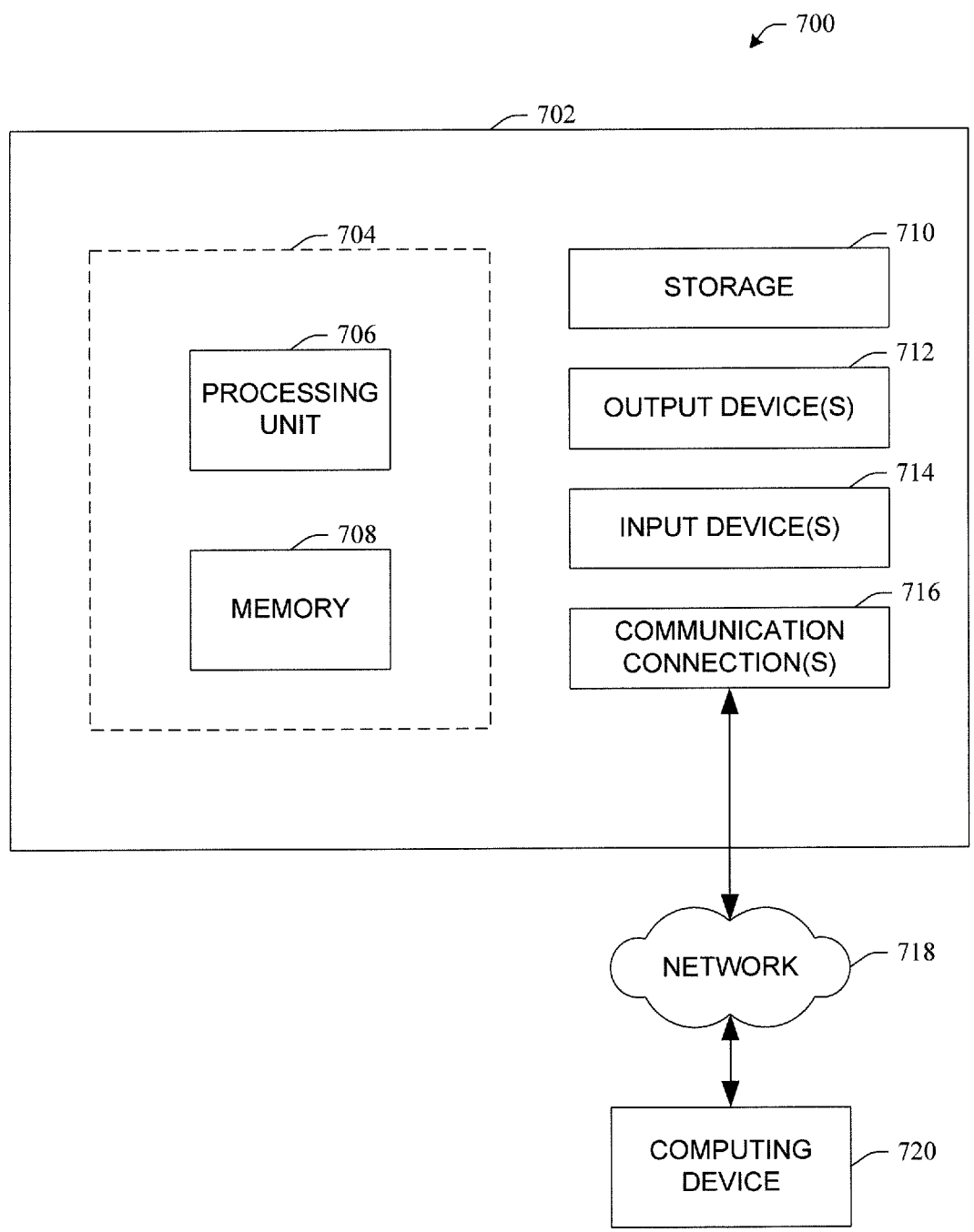
FIG. 7 illustrates a computing environment where one or more of the provisions set forth herein can be implemented, according to some embodiments.

FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular data types. Typically, the functionality of the computer readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data center capacity planning, comprising:
    a processor coupled to a memory that stores instructions that when executed cause the processor to:
        transform into a common format data regarding capacity of one or more data centers received from a plurality of data center infrastructure management (DCIM) tools;
        store transformed data in an aggregated database;
        render a user interface that presents at least a subset of transformed data in the aggregated database; and
        update the user interface such that the user interface dynamically switches context after selection of presented data that includes a link operable to initiate a query that returns data from the aggregated database, wherein context switch is based on current user interface state and nature of a DCIM tool associated with the data returned from the aggregated database.

2. The system of claim 1, further comprising instructions that cause the processor to render, in the user interface, forecasted demand and available capacity.

3. The system of claim 1, further comprising instructions that cause the processor to compare and identify differences between data from two or more of the plurality of DCIM tools.

4. The system of claim 3, further comprising instructions that cause the processor to remediate the differences.

5. The system of claim 3 further comprising instructions that cause the processor to present the differences on the user interface.

6. The system of claim 1, further comprising instructions that cause the processor to minimize database table size based on size of data received.

7. The system of claim 1, wherein the user interface that provides simultaneous access to the data from at least two of the plurality of DCIM tools.

8. The system of claim 1, further comprising instructions that generate a report for rendering in the user interface based on the transformed data.

9. A method, comprising:
    receiving data associated with capacity of one or more data centers by way of a plurality of data center infrastructure management (DCIM) tools;
    transforming the data into a common format;
    storing transformed data in an aggregated database;
    generating a user interface that presents at least a subset of the transformed data in the aggregated database; and
    updating the user interface such that the user interface dynamically switches context after selection of presented data that includes a link operable to initiate a query that returns data from the aggregated database, wherein context switch is based on current user interface state and nature of a DCIM tool associated with the data returned from the aggregated database.

10. The method of claim 9, wherein generating the user interface further comprises rendering forecasted demand and available capacity.

11. The method of claim 9, the operations further comprising comparing data from two or more of the plurality of DCIM tools to identify one or more differences and remediating the one or more differences.

12. The method of claim 9, the operations further comprising minimizing size of a data structure for storing the transformed data.

13. The method of claim 12, wherein minimizing the size of the data structure comprises setting a table field size to a size of the largest member of a field.

14. The method of claim 9, the operations further comprising generating the user interface that provides simultaneous access to extracted data from at least two of the plurality of DCIM tools.

15. The method of claim 9, the operations further comprising generating a report for presentation in the user interface based on the transformed data.

16. A method of data capacity planning, comprising:
    executing, on a processor, instructions that cause the processor to perform operations comprising:
        transforming into a common format data associated with capacity of one or more data centers received from numerous data center infrastructure management (DCIM) tools, wherein at least a subset of the DCIM tools provide data associated with space, power, or cooling;

storing transformed data in a database;

generating a user interface that presents a subset of the transformed data in the database;

conveying the user interface to a display device for display;

receiving selection of presented data that includes a link operable to initiate a query that returns a subset of the transformed data in the database;

generating an updated user interface that switches context based on current user interface state and nature of a DCIM tool associated with the subset of the transformed data returned; and conveying the updated user interface to the display device for display.

17. The method of claim 16, the operations further comprising rendering, in the user interface, forecasted demand and available capacity.

18. The method of claim 16, the operations further comprising:

comparing data from two or more of the numerous DCIM tools to identify differences; and remediating the differences between the data from the two or more of the numerous DCIM tools.

19. The system of claim 1, wherein one of the plurality of DCIM tools is a sensor.

20. The method of claim 9, further comprising updating one or more user interface tabs dynamically based on the context switch.

* * * * *

UNITED STATES PATENT AND TRADEMARK OFFICE
CERTIFICATE OF CORRECTION

PATENT NO. : 11,138,221 B1  
APPLICATION NO. : 16/457200  
DATED : October 5, 2021  
INVENTOR(S) : Angelo Macugay et al.

Page 1 of 1

It is certified that error appears in the above-identified patent and that said Letters Patent is hereby corrected as shown below:

On the Title Page

Item (73), Delete:
"Assignee: WELLS FARGO BANK, N.A., San Fransisco, CA (US)"

And Insert:
-- Assignee: WELLS FARGO BANK, N.A., San Francisco, CA (US) --

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*